US011283228B2

(12) United States Patent
Prokhorov et al.

(10) Patent No.: US 11,283,228 B2
(45) Date of Patent: Mar. 22, 2022

(54) UNIVERSAL ADAPTER FOR SENSORS

(71) Applicant: Toyota Motor Engineering & Manufacturing North America, Inc., Erlanger, KY (US)

(72) Inventors: Danil Prokhorov, Canton, MI (US); Scott L. Frederick, Brighton, MI (US); Todd Muck, Fowlerville, MI (US)

(73) Assignee: TOYOTA MOTOR ENGINEERING AND MANUFACTURING NORTH AMERICA, INC., Plano, TX (US)

( * ) Notice: Subject to any disclaimer, the term of this patent is extended or adjusted under 35 U.S.C. 154(b) by 203 days.

(21) Appl. No.: 16/681,181

(22) Filed: Nov. 12, 2019

(65) Prior Publication Data

US 2021/0143593 A1 May 13, 2021

(51) Int. Cl.
*H01R 29/00* (2006.01)
*H01R 13/66* (2006.01)
*H01R 33/945* (2006.01)
*H01R 4/01* (2006.01)

(52) U.S. Cl.
CPC .............. *H01R 29/00* (2013.01); *H01R 4/01* (2013.01); *H01R 13/6683* (2013.01); *H01R 33/945* (2013.01)

(58) Field of Classification Search
CPC .. H01R 29/00; H01R 13/6683; H01R 33/945; H01R 31/06; H01R 27/00; H01R 13/6453; H01R 4/01; G06F 13/409; B60R 16/00
USPC ................. 439/161, 166, 171–175, 518, 913
See application file for complete search history.

(56) References Cited

U.S. PATENT DOCUMENTS

| 4,687,269 | A | 8/1987 | Dubertret et al. |
| 4,720,270 | A | 1/1988 | Guenin et al. |
| 4,810,201 | A | 3/1989 | de Mendez et al. |
| 5,092,784 | A | 3/1992 | de Mendez et al. |
| 5,217,382 | A | 6/1993 | Sparks |

(Continued)

FOREIGN PATENT DOCUMENTS

| CN | 2884563 Y | 11/2005 |
| DE | 10243900 B3 | 4/2004 |

(Continued)

OTHER PUBLICATIONS

Scorpion Automotive Ltd., "Scorpion Parking Sensors," www.scorpionauto.com/parking-sensors/, 2019, 9 pages.

*Primary Examiner* — Travis S Chambers
(74) *Attorney, Agent, or Firm* — Jordan IP Law, LLC

(57) ABSTRACT

An adaptor for a sensor having a sensor connector. The adaptor includes a receptacle base configured to, upon insertion of the sensor connector, align with the structural shape, and/or size, and/or configuration of the sensor connector and establish a structural connection therewith. The adaptor may also include one or more receivers, configured to, in response to the conformance in the structural shape, and/or size, and/or configuration of the receptacle base, move relative to the receptacle base to align with axis of an optical arrangement or pin arrangement of the sensor connector. Such an alignment is to result in the mating of the adaptor and sensor connector which thereby establishes an electrical connection or an optical connection therewith. The adaptor may also include a processing device configured to determine one or more characteristics of output from the sensor connector.

14 Claims, 7 Drawing Sheets

(56) References Cited

U.S. PATENT DOCUMENTS

| | | | |
|---|---|---|---|
| 7,255,571 B2 | 8/2007 | Brodsky et al. | |
| 8,859,990 B2 | 10/2014 | Ng et al. | |
| 10,069,245 B2 | 9/2018 | Huhmann et al. | |
| 10,170,850 B2 * | 1/2019 | Jandt | H01R 12/721 |
| 2005/0172462 A1 | 8/2005 | Rudduck et al. | |
| 2008/0160800 A1 | 7/2008 | Dai et al. | |
| 2014/0002011 A1 * | 1/2014 | Ang | B60L 53/68 |
| | | | 320/107 |
| 2017/0001529 A1 * | 1/2017 | Fuchs | B60L 53/30 |

FOREIGN PATENT DOCUMENTS

| | | |
|---|---|---|
| EP | 0123376 A2 | 10/1984 |
| EP | 0196256 B1 | 11/1990 |
| EP | 2302230 A2 | 3/2011 |
| GB | 1254352 * | 11/1971 |
| JP | 2004152553 A | 10/2002 |

* cited by examiner

UNIVERSAL ADAPTER FOR SENSORS

TECHNICAL FIELD

Embodiments relate generally to an adaptor or receiver that is to accept any type of sensor therein, regardless of shape, size, and connector/pin configuration.

BACKGROUND

Currently, when a sensor is changed or upgraded, for example, by exchanging a first generation sensor with a second generation sensor, the structural shape, cross-section, and/or size of the sensor, connection points (e.g., connection bolts, etc.) and communications connector/pin configurations may be incompatible, for example, structurally different and non-adaptable. As such, the sensor cannot be adequately exchanged without replacing the entire receptacle and reconfiguring the communications ports/pin receivers/optical connectors.

BRIEF SUMMARY

In an embodiment, an adaptor for a sensor, such as, for example, a vehicle sensor having a sensor connector, may comprise a receptacle base. The receptacle base is selectively moveable between a first state and a second state. In the first state, the at least one region of the receptacle base has a first structural shape. In the second state the at least one region has a second structural shape that conforms to a structural shape of the sensor connector to thereby establish an operational interconnection therewith.

In accordance with the embodiment, at least a portion of the receptacle base is composed of a shape memory material comprising one or more of a metal material, a polymer material, and a composite material.

In accordance with the embodiment, the receptacle base comprises a receiver region having one or more sockets configured to receive pins of the sensor connector.

In accordance with the embodiment, movement of the at least one region causes the sockets to conform to a specific arrangement of the pins.

In accordance with the embodiment, movement of the at least one region causes axial alignment of the sockets and the pins.

In accordance with the embodiment, the adaptor further comprises a processing device. The processing device is configured to, upon the establishment of the operational connection, determine one or more characteristics of output from each pin of the sensor connector. The processing device is also configured to direct, based on the determination, transmission of the output to specific vehicle components and/or vehicle electronic modules.

In accordance with the embodiment, the adaptor further comprises a processing device. The processing device is configured to detect the arrangement of pins of the sensor connector. The processing device is also configured to cause the at least one region to move, based on the arrangement detection, to the second structural shape. The processing device is configured to determine one or more characteristics of output from the sensor connector. The processing device is configured to direct, based on the characteristics determination, transmission of the output to specific vehicle components and/or vehicle electronic modules.

In another embodiment, an adaptor for a sensor, such as, for example, a vehicle sensor having a sensor connector, may comprise: a receptacle base selectively moveable between a first state and a second state. In the first state, at least one region of the receptacle base has a first structural shape. In the second state, the at least one region has a second structural shape that conforms to a structural shape of the sensor connector. The adaptor also comprises one or more receiver regions. Each receiver region is configured to, in response to movement by the at least one region, conform to a pin arrangement of the sensor connector to establish an operational connection therewith.

In accordance with the embodiment, the at least one region of the receptacle base is composed of a shape memory material comprising one or more of a metal material, a polymer material, and a composite material.

In accordance with the embodiment, each receiver region comprises one or more sockets configured to receive pins of the sensor connector.

In accordance with the embodiment, movement of the at least one region causes the sockets to conform to a specific arrangement of the pins.

In accordance with the embodiment, movement of the at least one region causes axial alignment of the sockets and the pins.

In accordance with the embodiment, the adaptor further comprises a processing device. The processing device is configured to, upon the establishment of the operational connection, determine one or more characteristics of output from each pin of the sensor connector. The processing device is configured to direct, based on the determination, transmission of the output to specific vehicle components and/or vehicle electronic modules.

In accordance with the embodiment, the adaptor further comprises a processing device. The processing device is configured to detect the arrangement of pins of the sensor connector. The processing device is configured to cause the at least one region to move, based on the detection, to the second structural shape. The processing device is configured to determine one or more characteristics of output from the sensor connector. The processing device is configured to direct, based on the determination, transmission of the output to specific vehicle components and/or vehicle electronic modules.

In an additional embodiment, an adaptor for a sensor, such as, for example, a vehicle sensor having a sensor connector, may comprise a receptacle base selectively moveable between a first state and a second state. In the first state, at least one region of the receptacle base has a first structural shape. In the second state, the at least one region has a second structural shape that conforms to a structural shape of the sensor connector to thereby establish an operational connection therewith. The adaptor also comprises a processing device operatively connected to the receptacle base. The processing device is configured to, upon the establishment of the operating connection, determine one or more characteristics of output from each pin of the sensor connector. The processing device is configured to direct, based on the determination, transmission of the output to specific vehicle components and/or vehicle electronic modules.

In accordance with the embodiment, the at least one region of the receptacle base is composed of a shape memory material comprising one or more of a metal material, a polymer material, and a composite material.

In accordance with the embodiment, the adaptor further comprises one or more receiver regions. Each receiver region is configured to, in response to the movement by the at least one region of the receptacle base, move independently relative to each other. In that way, the receiver region is to conform to a specific arrangement of the pins.

In accordance with the embodiment, each receiver region comprises one or more sockets configured to receive pins of the sensor connector.

In accordance with the embodiment, movement of the at least one region causes axial alignment of the sockets and the pins.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
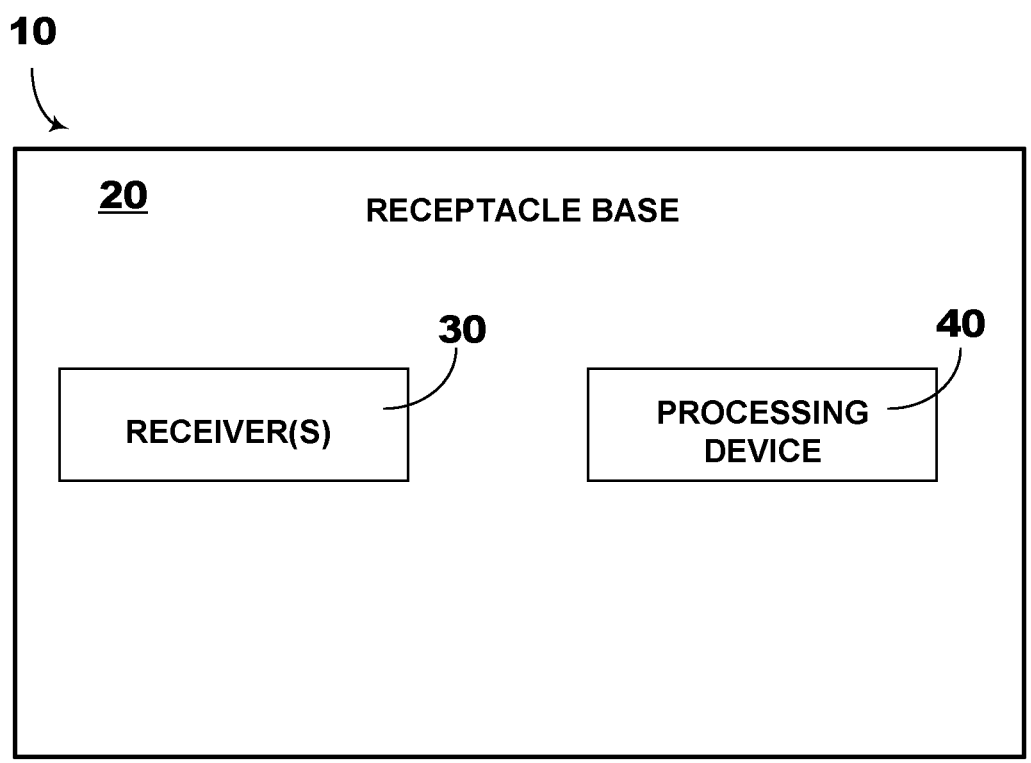
FIG. 1 illustrates a diagram of an example of an adaptor, in accordance with an embodiment.
Figure 2:
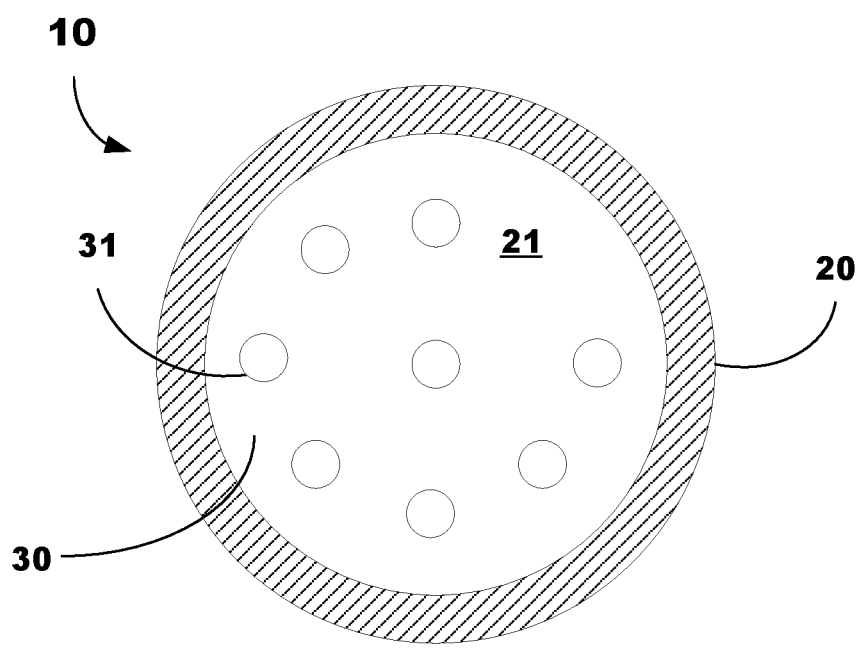
FIG. 2 illustrates a front cross-sectional view of an example of an adaptor, in accordance with an embodiment.

Turning to the figures, in which FIGS. 1 and 2 respectively illustrate an adaptor 10 for a sensor to be changed or upgraded. Such an adaptor 10 may comprise a receptacle base 20, one or more receivers 30, and a processing device 40. The adaptor 10 may be configured to establish an operational connectional (e.g., electrical, mechanical, fluidic, optical, electromagnetic, electromechanical, etc.) with various types of vehicle sensors/sensor modules, such as, for example, those used in a vehicle engine management system, advanced driver-assistance system (ADAS), and the like.

In accordance with embodiments, the receptacle base 20 may, in whole or in part, selectively and/or dynamically move between a first state or position and a second state or position. The second state may be different than the first state. For example, the first state may comprise a non-operating state, position, or condition whereas the second state may be an operating state, position, or condition.

Although the illustrated receptacle base 20 has a substantially circular cross-section, embodiments, are not limited therewith. Accordingly, the receptacle base 20 may encompass any other geometric structural configuration that falls within the spirit and scope of the principles of this disclosure set forth herein. The first state may also be one in which the receptacle base 20 has a first geometric configuration, and the second state may also be one in which the receptacle base 20 has a second geometric configuration that is different than the first geometric configuration. The first state may also be one in which the interface region 21 is in a non-contacting (e.g., e.g., electrical, mechanical, fluidic, optical, electromagnetic, electromechanical, etc.) relationship with the sensor connector.

In accordance with embodiments, the material composition of the receptacle base 20 may, in whole or in part, comprise a shape memory material capable of facilitating movement of the receptacle base 20 between the first state and the second state. For example, one or more regions of the receptacle base 20 may comprise a shape memory material whereas the remaining regions of the receptacle base 20 may comprise other materials. In particular, the section adjacent to the interface region 21 or the interface region 21 itself may comprise a shape memory material whereas the remaining regions of the receptacle base 20 may comprise other materials. The shape memory material should have physical properties capable of withstanding the operational environment of the adaptor 10. Such a shape memory material may comprise, for example, one or more of a metal material, a polymer material, and/or a composite material. Embodiments, however, are not limited thereto, and thus, the receptacle base 20 may be composed of other materials that fall within the spirit and scope of the principles of this disclosure set forth herein.

In accordance with embodiments, the adaptor may be configured to retain any type of sensor or other vehicle component having a data connector.

As illustrated in FIG. 2, the receptacle base 20 may comprise, at the interface region 21 thereof, a pin receiver 30. The receiver 30 may be independently moveable relative to other regions of the receptacle base 20 to conform to a specific arrangement of pins of the sensor connector. Such movement may be in a linear direction and/or an angular direction. Such movement may be in response to movement by another region(s) of the receptacle base 20. The receiver 30 comprises one or more openings or sockets 31 configured to receive the corresponding pins which thereby forms an interconnection between the adaptor 10 and the sensor. Such an interconnection is such that the output (e.g., electrical signals) from the sensor may be transmitted, regardless of the particular type of pin configuration. Each socket 31 may comprise a rigid or flexible conductor material configured to receive a corresponding pin to establish electrical conductive contact therewith.

Alternatively, for optical signal/data transmissions, the optical connector(s) of the sensor connector may establish operative contact with corresponding receiver(s). For example, the sockets 31 of the pin receiver 30 may be configured to receive the optical connector(s) in order that the output from the sensor connector (e.g., optical signals) are transmitted, regardless of pin configuration.

Figure 3:
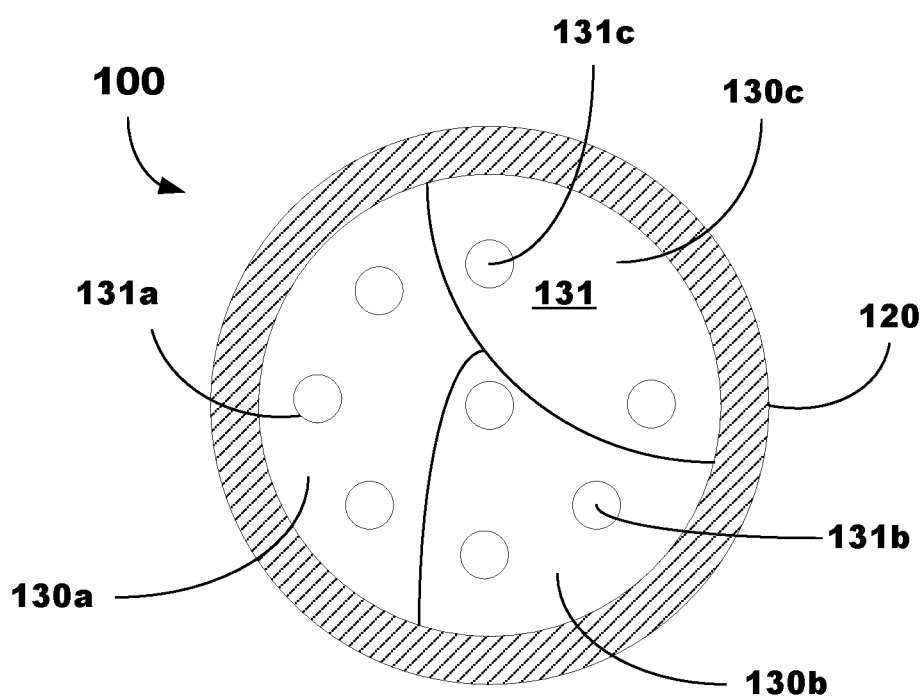
FIG. 3 illustrates a front cross-sectional view of an example of an adaptor, in accordance with another embodiment.

As illustrated in FIG. 3, the receptacle base 120 may comprise, at the interface region 121 thereof, a plurality of receiver regions 130a, 130b, 130c. The receiver regions 130a, 130b, 130c may be independently moveable relative to each other to conform to a specific arrangement of the pins of the sensor connector. Such movement may be in a linear direction and/or an angular direction. Such movement may be in response to movement by another region(s) of the receptacle base 120. Each receiver region 130a, 130b, 130c comprises one or more openings or sockets 131a, 131b, 131c configured to receive corresponding pins which thereby forms an interconnection between the adaptor 100 and the sensor. Such an interconnection is such that the output (e.g., electrical signals) from the sensor may be transmitted, regardless of the particular type of pin configuration. Each socket 31 may comprise a rigid or flexible conductor material configured to receive a corresponding pin to establish electrical conductive contact therewith.

Alternatively, for optical signal/data transmissions, the optical connector(s) of the sensor connector may establish operative contact with corresponding receiver(s). For example, the sockets 131a, 131b, 131c may be configured to receive the optical connectors in order that the output from the sensor connector (e.g., optical signals) are transmitted, regardless of configuration.

Figure 4:
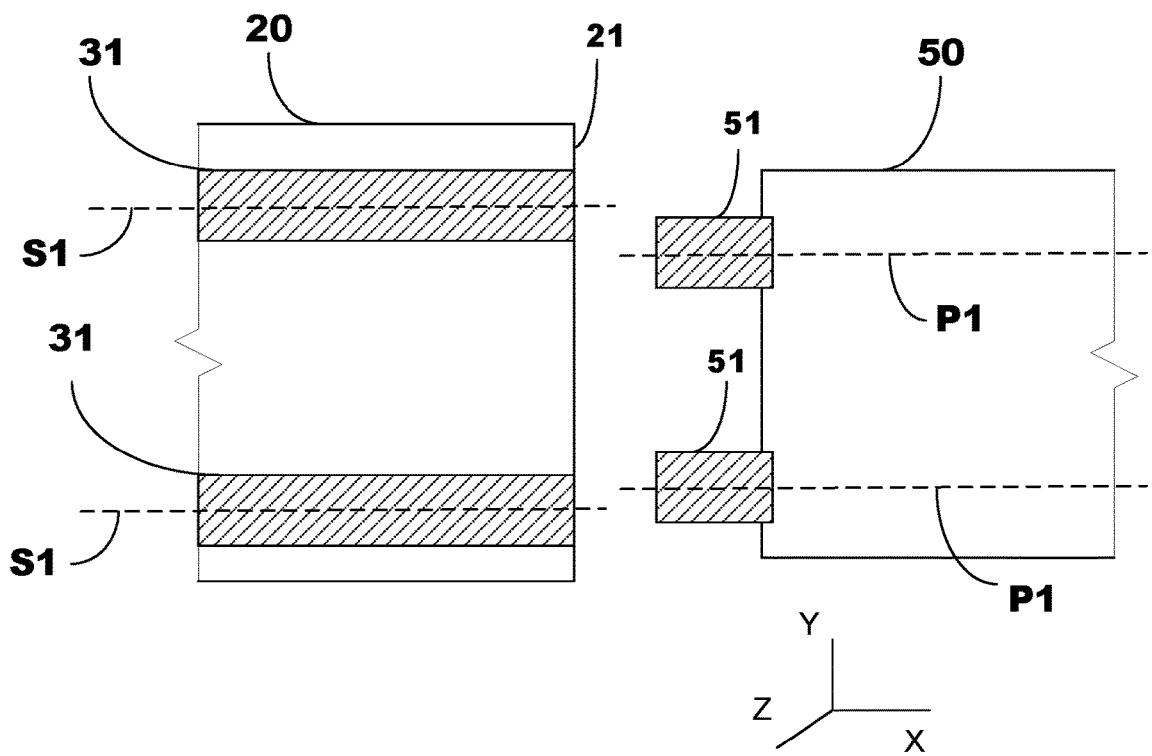
FIG. 4 illustrates a side cross-sectional view of an example of an adaptor in a first state, in accordance with an embodiment.

As illustrated in FIG. 4, in the first state, the section of the receptacle base 20 situated adjacent to an interface region 21 of the receptacle base 20 has a first structural shape, size, and/or geometric configuration. In the first state, the longitudinal axis S1 of the sockets 31 is misaligned with the longitudinal axis P1 of the pins 51 (or optical connectors) of the sensor connector 50.

Figure 5:
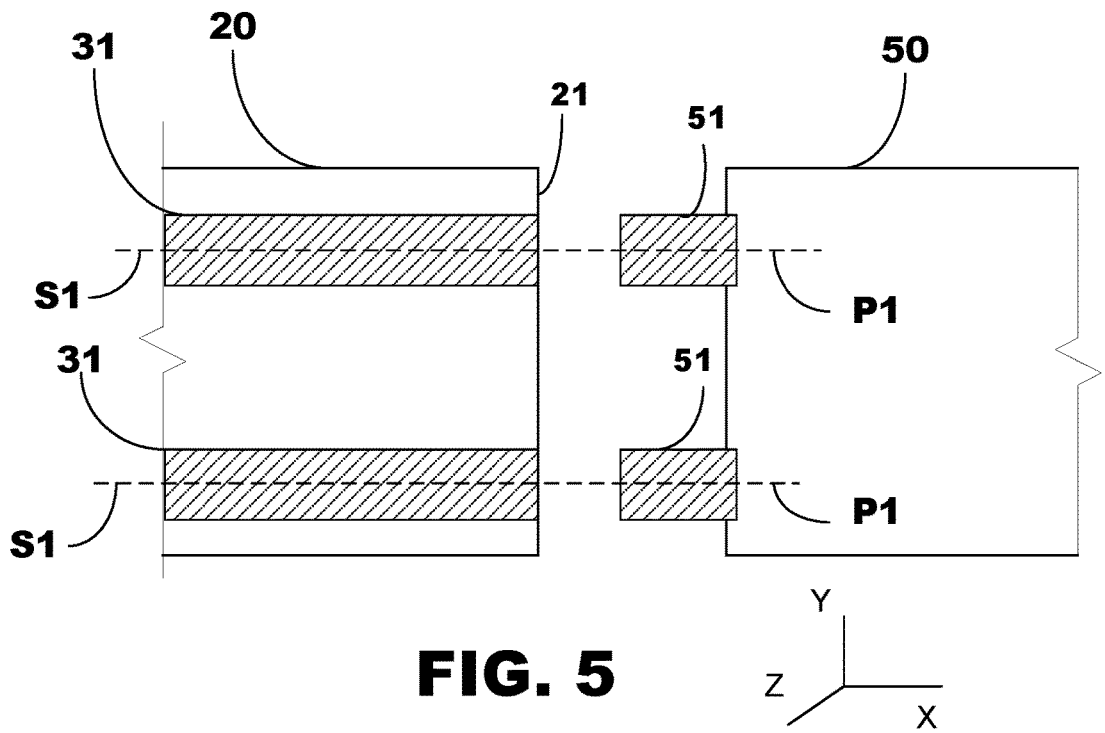
FIG. 5 illustrates a side cross-sectional view of an example of an adaptor in a second state, in accordance with an embodiment.

As illustrated in FIG. 5, in the second state of the receptacle base 20, the section of the receptacle base 20 adjacent to the interface region 21 (not shown in FIG. 5) may be moveable to conform to or otherwise adopt the structural shape, size, and/or geometric configuration of a corresponding interface region of the sensor connector 50. In response thereto, or otherwise in synch with this movement, the receiver 30 moves to facilitate alignment of the longitudinal axis S1 of the sockets 31 with the longitudinal axis P1 of the pins 51 (or optical connectors). Such alignment is to result in the mating of the adaptor 10 and sensor connector 50 which thereby establishes an electrical connection (or an optical connection) therewith. The second state may also be one in which the receptacle base 20 and the sensor connector 50 are interconnected, at the interface region 21, by direct contact (e.g., e.g., electrical, mechanical, fluidic, optical, electromagnetic, electromechanical, etc.).

The structural shape, size, and/or geometric configuration of the receptacle base 20 (or at least the section adjacent to the interface region 21) may be maintained at least until removal or disconnection of the interconnection (e.g., e.g., electrical, mechanical, fluidic, optical, electromagnetic, electromechanical, etc.) of the receptacle base 20 and the sensor connector 50. In such an instance, at least the section adjacent to the interface region 21 is caused to return to the first state.

In accordance with embodiments, movement by the receptacle base 20 (or at least the section adjacent to the interface region 21) and each receiver 30 may be synchronized. For example, in response to movement by the receptacle base 20, the receiver 30 may be configured for movement independently of each other to facilitate alignment of the sockets 31 with an axis of a corresponding pin 51 (or optical connector) of the sensor connector 50. Alternatively or additionally, the receptacle base 20 may be configured for movement in response to movement by one or more of the receivers 30. Such alignment is to result in the interconnection of the adaptor 10 and the sensor connector 50 which thereby establishes the operational connection (e.g., electrical connection or optical connection).

The processing device 40 may be operatively connected to the receptacle base 20 and/or the receiver 30. The processing device 40 may be provided on or in the receptacle base 20 to be entirely or partially enclosed by the receptacle base 20. For example, the processing device 40 may be arranged for mounting on a substrate provided on the receptacle base 20. The substrate may be composed of, in whole or in part, an electrically conductive material. The substrate may be directly (via direct physical contact) or indirectly (via wiring, cable or the like) operatively connected electrically to the pins 51 of the sensor connector 50 upon establishing an interconnection of the adaptor 10 and the sensor connector 50. Alternatively, the substrate may be operatively connected optically to the fibers of the sensor connector 50. The processing device 40 may be protected against the outside operational environment by having one or more encapsulation layers arranged thereon/thereover.

Figure 6:
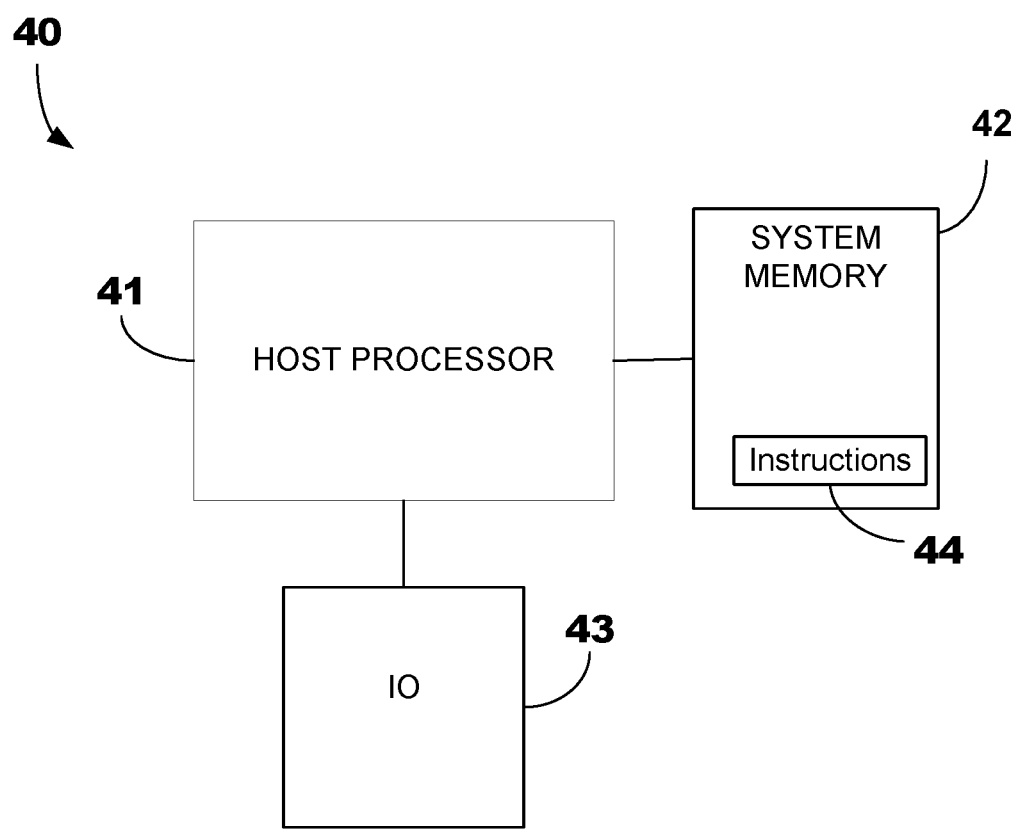
FIG. 6 illustrates a diagram of a processing device for the adaptor, in accordance with embodiments.

As illustrated in FIG. 6, the processing device 40 may be part of an existing vehicle computing system, such as, for example, the vehicle ECU. The processing device 40 may comprise a host processor 41 that is operatively connected to an I/O unit 43 to enable communication with other vehicle components and/or devices. The I/O unit 43 may be directly connected to such other devices, or may be connected with other devices via the use of a hub or switch interface.

The host processor 41 may be operatively coupled to a system memory 42 which is to store a set of instructions 44. When executed by the host processor 41, the set of instructions 44 may cause the host processor 41 to dynamically detect an operational connection (e.g., electrical, mechanical, fluidic, optical, electromagnetic, electromechanical, etc.) between the adapter 10 and the sensor connector 50. The set of instructions 44 may cause the host processor 41 to determine, based on the detection, one or more characteristics (e.g., a nature and/or type of signal) of output from each pin of the sensor connector from each pin connector (or optical connector) of the sensor connector 50. The set of instructions 44 may cause the host processor 41 to direct, based on the determination, transmission of the output to specific vehicle components and/or vehicle electronic modules.

Alternatively, the set of instructions 44 may cause the host processor 41 to detect and/or determine the arrangement of pins of the sensor connector 50. The set of instructions 44 may cause the host processor 41, in response to the detection and/or determination, move the receiver 30 and/or receptacle base 20 to axially align the sockets 31 with the pin connectors 51 (or optical connectors) of the sensor connector 50. The set of instructions 44 may cause the host processor 41 to detect, after the axial alignment, an operational connection (e.g., electrical, mechanical, fluidic, optical, electromagnetic, electromechanical, etc.) between the adapter 10 and the sensor connector 50. The set of instructions 44 may cause the host processor 41 to determine, based on the detection, one or more characteristics (e.g., a nature and/or type of signal) of output from each pin of the sensor connector from each pin connector (or optical connector) of the sensor connector 50. The set of instructions 44 may cause the host processor 41 to direct, based on the determination, transmission of the output to specific vehicle components and/or vehicle electronic modules.

Meaning, the set of instructions 44 may cause the host processor 41 to map the signals of each pin/fiber to specific destination(s). Take an example in which a pin 51 (or an optical connector) in a pin arrangement is to transmit signals to a LIDAR processing unit. The set of instructions 44 may cause the host processor 41 to determine the characteristics of the signal(s) transmitted via the pin 51. The set of instructions 44 may then cause the host processor 41 to direct the signal(s) from the pin 51 to the LIDAR processing unit. Alternatively, in instances in which the sensor connector 50 comprises an optical connector for transmitting optical signals via light, the set of instructions 44 may then cause the host processor 41 to determine the characteristics of the light carrying the various signal(s) and direct the light signals accordingly.

The receptacle base 20 and/or the receivers 30 may be 3D printed to conform to the structural shape, size, and configuration of a specific sensor connector and the arrangement of pins of the sensor connector. As an example, such a 3D printed receiver may be coupled to the processing device such that the processing device can determine the nature of the various signals received on each pin and direct the signals to vehicle components accordingly.

Figure 7:
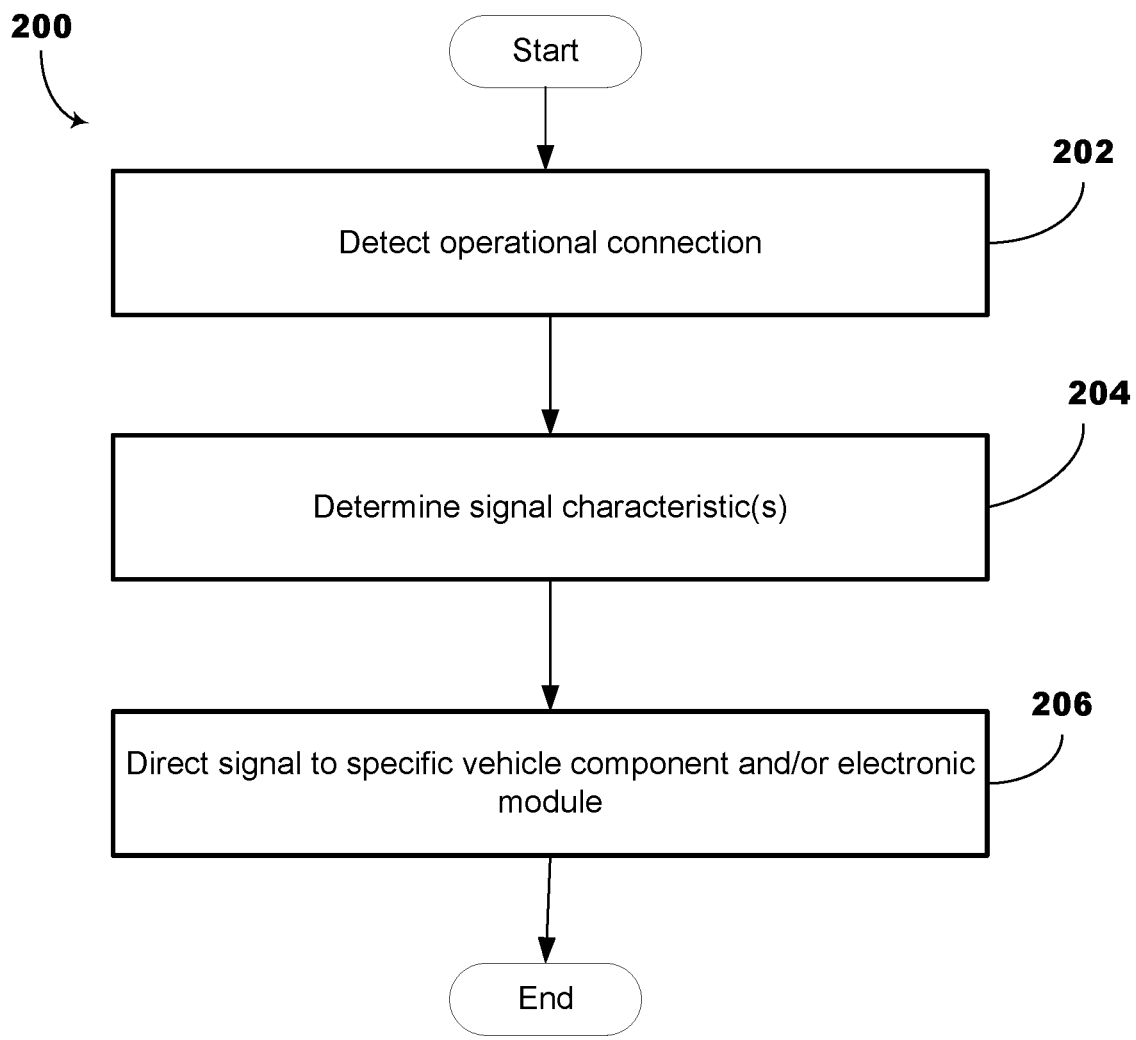
FIG. 7 is a flowchart of an example of a method, in accordance with an embodiment.
Figure 8:
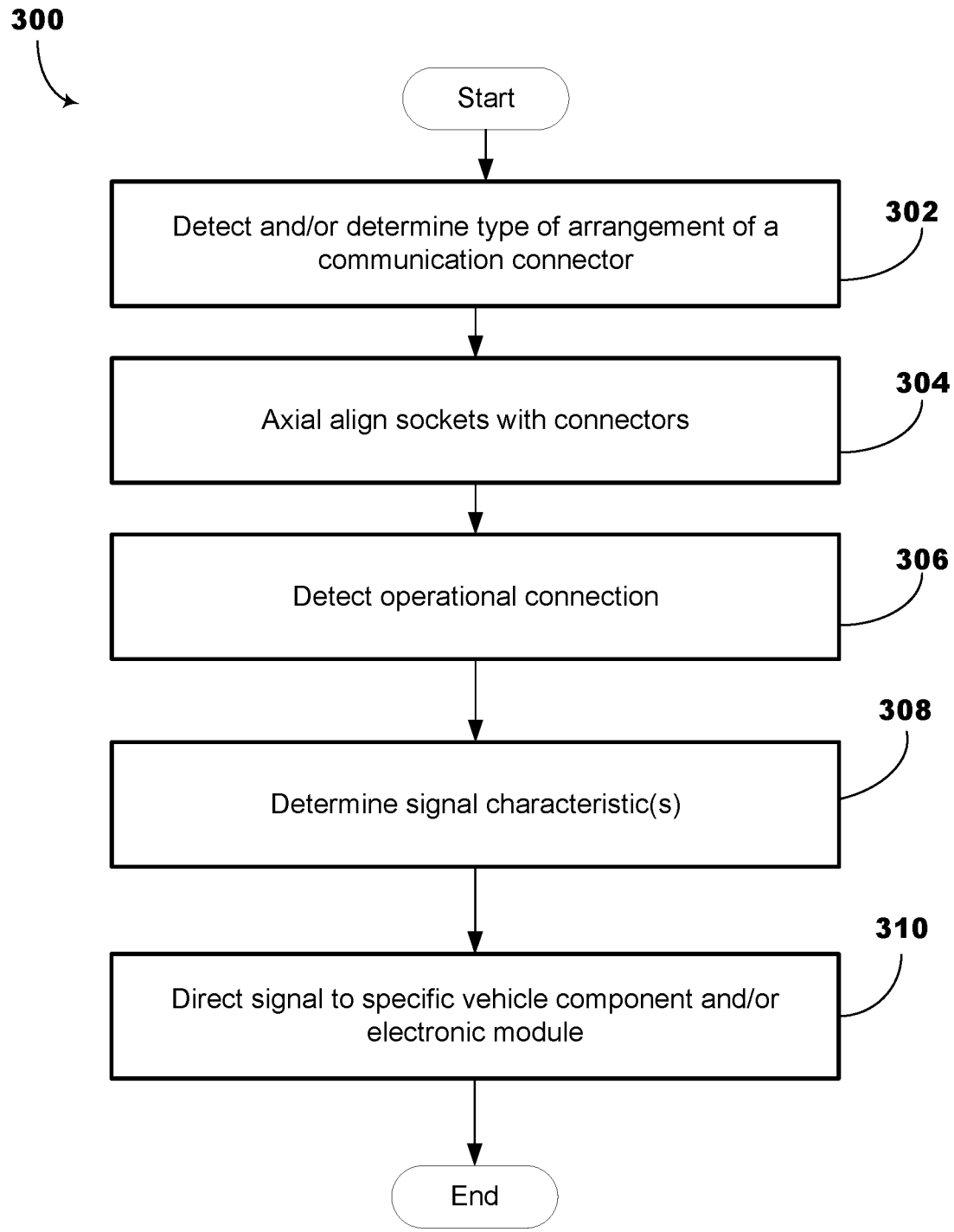
FIG. 8 is a flowchart of an example of a method, in accordance with another embodiment.
Figure 9:
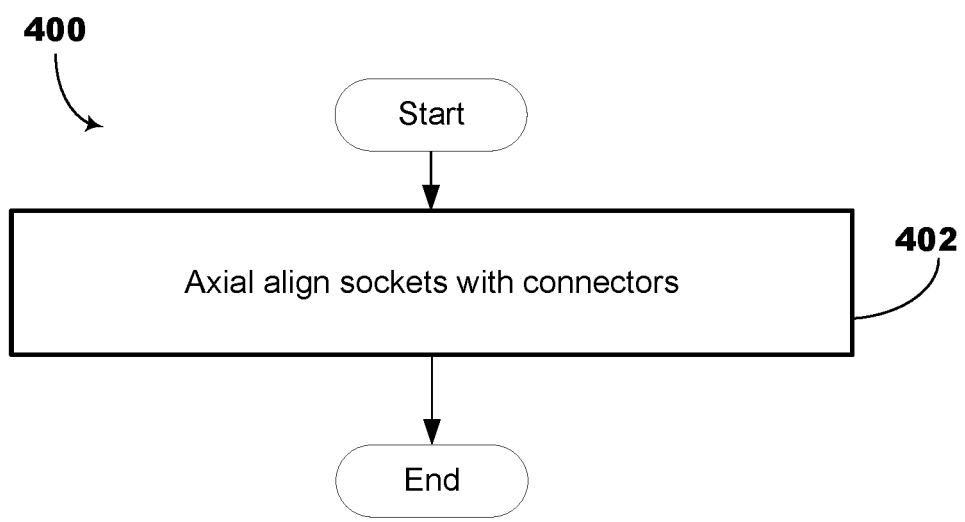
FIG. 9 is a flowchart of a method, in accordance with an embodiment.

As illustrated in FIGS. 7 to 9, methods 200, 300, and 400 for establishing a communications connection in a vehicle are provided. Each respective method 200, 300, and 400 may be implemented, for example, in logic instructions (e.g., software), configurable logic, fixed-functionality hardware logic, etc., or any combination thereof.

As illustrated in FIG. 7, processing block 202 includes dynamically detecting an operational connection (e.g., electrical, mechanical, fluidic, optical, electromagnetic, electromechanical, etc.) between an adapter and a connector. Such a connector may comprise, for example, a sensor connector.

Illustrated processing block 204 includes determining, based on the detection, one or more characteristics (e.g., nature and/or type of signal) of output from each pin (or optical connector) of the sensor connector.

Illustrated processing block 206 includes directing, based on the determination, transmission of the output to specific vehicle components and/or vehicle electronic modules.

As illustrated in FIG. 8, processing block 302 includes detecting and/or determining a type of arrangement of a sensor connector. Such a determination may comprise detecting the existence of the sensor connector and then determining a type of arrangement of pins or optical connector of the sensor connector.

Illustrated processing block 304 includes axial aligning, in response to the detection and/or determination, sockets of a receiver for an adaptor with the pin connectors (or optical connectors) of the sensor connector. Such axial alignment may comprise causing movement of the receiver and/or receptacle base of the adaptor in a linear direction and/or an angular direction. Such axial alignment may comprise causing movement of a plurality of receivers independently relative to each other to conform to a specific arrangement of the pins (or optical connectors) of the sensor connector.

Illustrated processing block 306 includes detecting, e.g., after the axially alignment, an operational connection (e.g., electrical, mechanical, fluidic, optical, electromagnetic, electromechanical, etc.) between the adapter and the sensor connector.

Illustrated processing block 308 includes determining, based on the detection, one or more characteristics (e.g., nature and/or type of signal) of output from each pin (or optical connector) of the sensor connector.

Illustrated processing block 310 includes directing, based on the determination, transmission of the output to specific vehicle components and/or vehicle electronic modules.

As illustrated in FIG. 9, processing block 402 includes axial aligning sockets of a receiver for an adaptor with pins (or optical connectors) of a sensor connector. Such axial alignment may comprise causing movement of the receiver and/or receptacle base of the adaptor in a linear direction and/or an angular direction. Such axial alignment may comprise causing movement of a plurality of receiver independently relative to each other in a linear direction and/or an angular direction to conform to a specific arrangement of the pins (or optical connectors) of the sensor connector.

In accordance with embodiments, movement of the adaptor to conform to the structural shape, size, and configuration of a sensor connector facilitates quick and efficient changes or upgrades in sensors. And particularly, such movement accommodates a wide variety of sensors having various communication/data connector (e.g., pins, optical connectors, etc.) arrangements. This also reduces the overall costs of replacements and upgrades.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An adaptor for a sensor having a sensor connector, the adaptor comprising:
   a receptacle base selectively moveable between a first state in which at least one region of the receptacle base has a first structural shape, and a second state in which the at least one region has a second structural shape that conforms to a structural shape of the sensor connector to thereby establish an operational interconnection therewith,
   wherein the receptacle base comprises a receiver region having one or more sockets configured to receive pins of the sensor connector, and
   wherein movement of the at least one region causes axial alignment of the sockets and the pins.

2. The adaptor of claim 1, wherein at least a portion of the receptacle base is composed of a shape memory material comprising one more of a metal material, a polymer material, and a composite material.

3. The adaptor of claim 1, wherein movement of the at least one region causes the sockets to conform to a specific arrangement of the pins.

4. An adaptor for a sensor having a sensor connector, the adaptor comprising:
   a receptacle base selectively moveable between a first state in which at least one region of the receptacle base has a first structural shape, and a second state in which the at least one region has a second structural shape that conforms to a structural shape of the sensor connector to thereby establish an operational interconnection therewith; and
   a processing device configured to, upon the establishment of the operational connection:
     determine one or more characteristics of output from each pin of the sensor connector, and
     direct, based on the determination, transmission of the output to specific vehicle components and/or vehicle electronic modules.

5. An adaptor for a sensor having a sensor connector, the adaptor comprising:
   a receptacle base selectively moveable between a first state in which at least one region of the receptacle base has a first structural shape, and a second state in which the at least one region has a second structural shape that conforms to a structural shape of the sensor connector to thereby establish an operational interconnection therewith; and a processing device configured to:
  detect the arrangement of pins of the sensor connector;
  cause, based on the detection, the at least one region to move to the second structural shape;
  determine one or more characteristics of output from the sensor connector, and
  direct, based on the determination, transmission of the output to specific vehicle components and/or vehicle electronic modules.

6. An adaptor for a sensor having a sensor connector, the adaptor comprising:
  a receptacle base selectively moveable between a first state in which at least one region of the receptacle base has a first structural shape, and a second state in which the at least one region has a second structural shape that conforms to a structural shape of the sensor connector; and
  one or more receiver regions, each receiver region configured to, in response to movement by the at least one region, conform to a pin arrangement of the sensor connector to establish an operational connection therewith,
  wherein each receiver region comprises one or more sockets configured to receive pins of the sensor connector, and
  wherein movement of the at least one region causes axial alignment of the sockets and the pins.

7. The adaptor of claim 6, wherein the at least one region of the receptacle base is composed of a shape memory material comprising one or more of a metal material, a polymer material, and a composite material.

8. The adaptor of claim 6, wherein movement of the at least one region causes the sockets to conform to a specific arrangement of the pins.

9. An adaptor for a sensor having a sensor connector, the adaptor comprising:
  a receptacle base selectively moveable between a first state in which at least one region of the receptacle base has a first structural shape, and a second state in which the at least one region has a second structural shape that conforms to a structural shape of the sensor connector;
  one or more receiver regions, each receiver region configured to, in response to movement by the at least one region, conform to a pin arrangement of the sensor connector to establish an operational connection therewith; and
  a processing device configured to, upon the establishment of the operational connection:
    determine one or more characteristics of output from each pin of the sensor connector, and
    direct, based on the determination, transmission of the output to specific vehicle components and/or vehicle electronic modules.

10. An adaptor for a sensor having a sensor connector, the adaptor comprising:
  a receptacle base selectively moveable between a first state in which at least one region of the receptacle base has a first structural shape, and a second state in which the at least one region has a second structural shape that conforms to a structural shape of the sensor connector;
  one or more receiver regions, each receiver region configured to, in response to movement by the at least one region, conform to a pin arrangement of the sensor connector to establish an operational connection therewith; and
  a processing device configured to:
    detect the arrangement of pins of the sensor connector;
    cause the at least one region to move to the second structural shape;
    determine one or more characteristics of output from the sensor connector, and
    direct, based on the determination, transmission of the output to specific vehicle components and/or vehicle electronic modules.

11. An adaptor for a sensor having a sensor connector, the adaptor comprising:
  a receptacle base selectively moveable between a first state in which at least one region of the receptacle base has a first structural shape, and a second state in which the at least one region has a second structural shape that conforms to a structural shape of the sensor connector to thereby establish an operational connection therewith;
  a processing device, operatively connected to the receptacle base, the processing device configured to, upon the establishment of the operating connection, determine one or more characteristics of output from each pin of the sensor connector, and direct, based on the determination, transmission of the output to specific vehicle components and/or vehicle electronic modules; and
  one or more receiver regions configured to, in response to the movement by the at least one region of the receptacle base, move independently relative to each other to conform to a specific arrangement of the pins.

12. The adaptor of claim 11, wherein the at least one region of the receptacle base is composed of a shape memory material comprising one or more of a metal material, a polymer material, and a composite material.

13. The adaptor of claim 11, wherein each receiver region comprises one or more sockets configured to receive pins of the sensor connector.

14. The adaptor of claim 11, wherein movement of the at least one region causes axial alignment of the sockets and the pins.

* * * * *